(12) United States Patent
Norbauer et al.

(10) Patent No.: US 11,755,125 B1
(45) Date of Patent: Sep. 12, 2023

(54) STABILIZER MECHANISM FOR A KEYBOARD AND A KEYBOARD HAVING THE STABILIZER MECHANISM

(71) Applicant: Norbauer & Co. LLC., Los Angeles, CA (US)

(72) Inventors: Ryan Norbauer, Los Angeles, CA (US); Bo Noergaard Klerk, Copenhagen (DK)

(73) Assignee: NORBAUER & CO. LLC, Los Angeles, CA (US)

( * ) Notice: Subject to any disclaimer, the term of this patent is extended or adjusted under 35 U.S.C. 154(b) by 0 days.

(21) Appl. No.: 18/144,478

(22) Filed: May 8, 2023

(51) Int. Cl.
 *G06F 3/02* (2006.01)
(52) U.S. Cl.
 CPC .................. *G06F 3/0224* (2013.01)
(58) Field of Classification Search
 CPC .................................... G06F 3/0224
 USPC ......................................... 345/168
 See application file for complete search history.

(56) References Cited

U.S. PATENT DOCUMENTS

| | | |
|---|---|---|
| 3,720,801 A | 3/1973 | Yanaga |
| 4,384,796 A | 5/1983 | Denley |
| 4,468,145 A | 8/1984 | Denley |
| 4,584,444 A | 4/1986 | Nagashima |
| 2003/0209417 A1 | 11/2003 | Yoneyama |
| 2004/0163937 A1* | 8/2004 | Ito .......................... H01H 3/125 200/5 A |
| 2004/0190230 A1* | 9/2004 | Mochizuki ............. H01H 13/70 361/600 |
| 2018/0129322 A1* | 5/2018 | Sah ....................... G06F 3/0393 |
| 2018/0197699 A1 | 7/2018 | Shen |

\* cited by examiner

*Primary Examiner* — Calvin C Ma
(74) *Attorney, Agent, or Firm* — Witters & Associates; Steve Witters

(57) ABSTRACT

Presently provided is a keyboard and stabilizer mechanism, the stabilizer mechanism has a first housing slidingly receiving a first slider and a second housing slidingly receiving a second slider. A wire has arms extending through openings in the housings and into the sliders. The stabilizer mechanism also has at least one of biasing members in the sliders, wire holders extending from the housings, and extensions extending from the sliders.

20 Claims, 5 Drawing Sheets

STABILIZER MECHANISM FOR A KEYBOARD AND A KEYBOARD HAVING THE STABILIZER MECHANISM

FIELD OF INVENTION

The present invention relates to stabilizer mechanisms and keyboards.

BACKGROUND OF THE INVENTION

Under the ANSI standard, some computer keyboard keys are longer than others. For example, keys such as the standard backspace key, spacebar, and other widened keys, which may benefit from stabilization. Without some form of stabilizer mechanism, an undesirable seesaw effect may occur when a user presses the far left or the far right of the longer keycaps.

A common keyboard keycap type currently in use is "Cherry MX" style keycap which has a stem with a negative cruciform geometry. These keycaps (typically made of ABS or PBT thermoplastics) are then press-fit onto spring-loaded electrical switches of various types, which have a positive version of the negative geometry on the keycap stem as the mounting point.

Smaller keys, such as alphanumeric character keys, may have just a single cruciform stem in their center and the longer keys may have one or two additional cruciform stems, placed to the side(s) of the switch position. These stabilizer stems fit into mating cruciform stems on stabilizer mechanisms (of varying types) on either side of the switch.

In the most common Cherry MX design, each stabilizer assembly is typically made of a bent wire and four injection molded parts: two sliders and two housings. The bent wire is disposed to link motion between each of the sliders, wherein each slider is held within a housing. These mechanisms essentially function as linked linear bearings that move up and down together, pulling both ends of the keycap up and down in tandem to mitigate any seesaw effect.

These common stabilizers may fail to provide an optimal stabilization of the keycaps. For example, the cooperation between the parts may be either loose or prone to binding. Unpleasant sounds, such as rattle or vibration may be exhibited by the currently provided keyboards. These undesired effects may be due to the sound of hard surfaces, plastic and wire, striking against each other when a keycap is pressed. A typical solution employed is an application of high-viscosity grease to fill the gaps between the hard plastic and wire parts of the slider and housing. The grease may mitigate the wire from rattling directly against the plastic of the slider and the plastic of the slider against the housing. However, the use of high-viscosity lubricant is a suboptimal solution for various reasons. Firstly, since it relies primarily on the bulk effect of the lubrication rather than its lubricating properties to provide the dampening, the effect wears away over time as the lubrication seeps away from the interstices between the mating parts. Regular maintenance or subsequent applications of grease can be onerous, as application of grease may require completely disassembling the keyboard. Additionally, it may be labor-intensive to produce and ship parts lubricated in this manner. For example, quality control of the consistency of assembly and application of the lubricant or grease may be challenging.

SUMMARY

In one aspect of the present disclosure, a keyboard is provided. The keyboard has a plurality of keys, each having a keycap, supported on a switch plate. Each of the keys has a lifting mechanism configured and disposed to bias its keycap from the switch plate. At least one of the keys has a stabilizer mechanism configured and disposed to stabilize its keycap. The stabilizer mechanism has a first housing slidingly receiving a first slider and a second housing slidingly receiving a second slider. The switch plate holds the first housing and the second housing, wherein the first housing is spaced from the second housing. The keycap is attached to the first slider and the second slider and traverses the space between the sliders. A wire has a first arm extending through an opening in the first housing and into the first slider, a second arm extending through an opening in the second housing and into the second slider, and a rotatable length extending between the first arm and the second arm. A first biasing member is in the first slider and is configured and disposed to bias the first wire arm from the keycap and to a lower lateral member in the first slider. A second biasing member is in the second slider and is configured and disposed to bias the second wire arm from the keycap and to a lower lateral member in the second slider.

In another aspect of the present disclosure, a keyboard is provided. The keyboard has a plurality of keys, each having a keycap, supported on a switch plate. Each of the keys has a lifting mechanism configured and disposed to bias its keycap from the switch plate. At least one of the keys has a stabilizer mechanism configured and disposed to stabilize its keycap. The stabilizer mechanism has a first housing slidingly receiving a first slider and a second housing slidingly receiving a second slider. The switch plate holds the first housing and the second housing, wherein the first housing is spaced from the second housing. The keycap is attached to the first slider and the second slider and traverses the space between the sliders. A wire has a first arm extending through an opening in the first housing and into the first slider, a second arm extending through an opening in the second housing and into the second slider, and a rotatable length extending between the first arm and the second arm. A first wire holder extends from the first housing and is configured and disposed to rotatingly hold the rotatable length of wire proximate its first arm. A second wire holder extends from the second housing and is configured and disposed to rotatingly hold the rotatable length of wire proximate its second arm. The rotatable length is cylindrical proximate each of the arms and each of the wire holders has three contact surfaces spaced about the rotatable length, with each of the contact surfaces are configured and disposed to maintain contact with the rotatable length throughout a depression of the keycap.

In a further aspect of the present disclosure, a keyboard is provided. The keyboard has a plurality of keys, each having a keycap, supported on a switch plate. Each of the keys has a lifting mechanism configured and disposed to bias its keycap from the switch plate. At least one of the keys has a stabilizer mechanism configured and disposed to stabilize its keycap. The stabilizer mechanism has a first housing slidingly receiving a first slider and a second housing slidingly receiving a second slider. The switch plate holds the first housing and the second housing, wherein the first housing is spaced from the second housing. The keycap is attached to the first slider and the second slider and traverses the space between the sliders. A wire has a first arm extending through an opening in the first housing and into the first slider, a second arm extending through an opening in the second housing and into the second slider, and a rotatable length extending between the first arm and the second arm. The first slider has a first extension and the first housing has a first vertical slot configured to slidingly receive the first extension. The second slider has a second extension and the second housing has a second vertical slot configured to slidingly receive the second extension. The extensions and the first and the second slots are configured and disposed to substantially eliminate rotational movement of the keycap and its lateral movement away from, and toward, the rotatable length, upon depression of the keycap.

BRIEF DESCRIPTION OF THE DRAWINGS

The foregoing and other features of this disclosure will become more fully apparent from the following description and appended claims, taken in conjunction with the accompanying drawings and examples. Understanding that these drawings depict only several embodiments in accordance with the disclosure and are therefore, not to be considered limiting of its scope, the disclosure will be described with additional specificity and detail through use of the accompanying drawings.

The following figures, which are idealized, are not to scale and are intended to be merely illustrative of aspects of the present disclosure and non-limiting. In the drawings, like elements may be depicted by like reference numerals. The drawings are briefly described as follows.

DETAILED DESCRIPTION OF THE INVENTION

Figure 1:
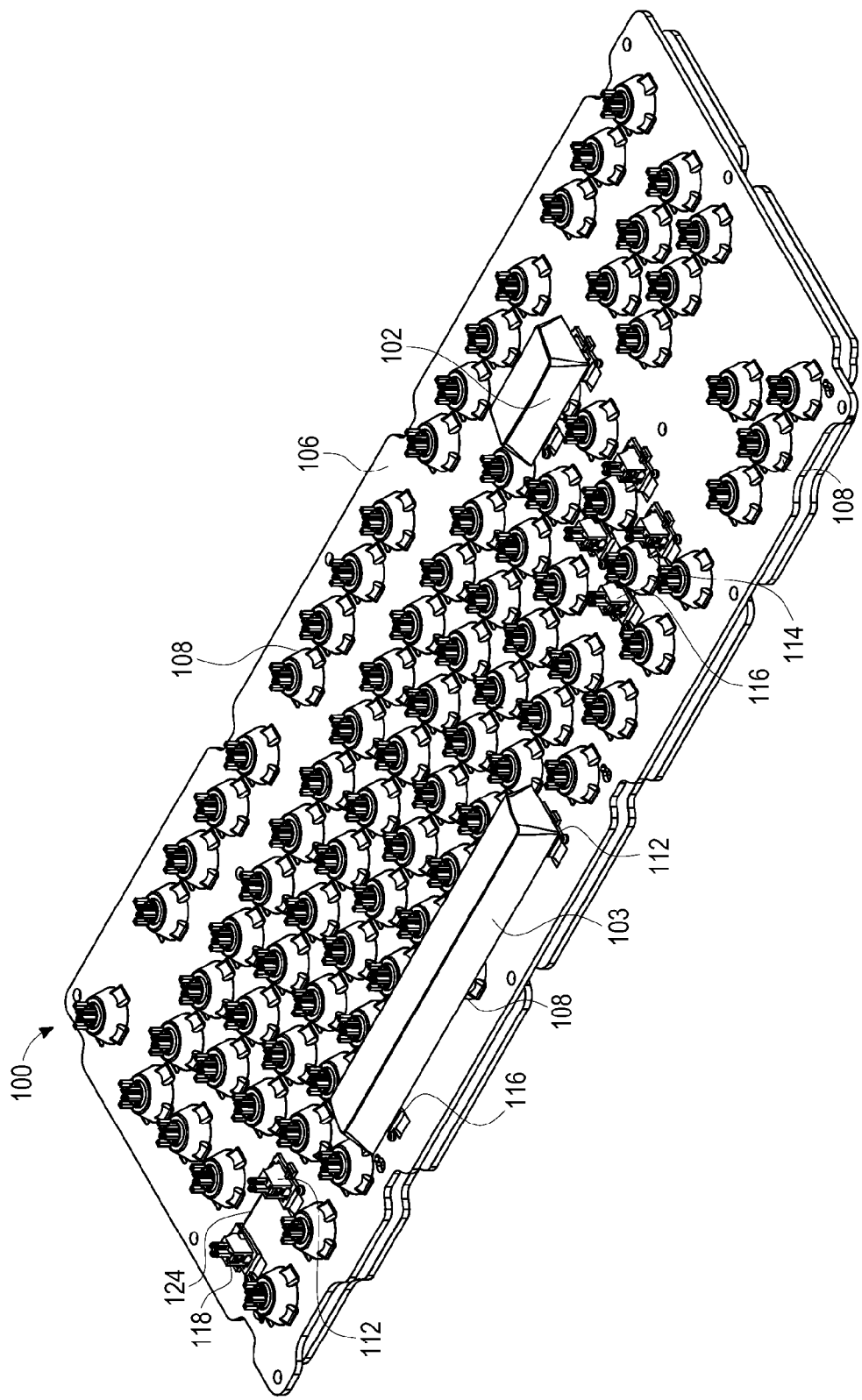
FIG. 1 shows an illustrative example of the presently disclosed keyboard having a stabilizer mechanism of the present disclosure.

The present disclosure provides a keyboard having a keycap stabilizing mechanism. Aspects of the present disclosure may provide a desired stabilization of keycaps which may provide for desired function upon its production. For example, current production processes such as injection molding, metal wire bending, or machining may be employed to provide a reliable, smooth, or quiet operating keyboard over a long period of time with minimal maintenance or manual tuning.

Terms as used herein:

The switch is the mechanism that sits beneath each keycap on a keyboard. It is responsible for registering when a key is pressed so that they keyboard can send a corresponding signal to the computer. There are several types of switches available, including mechanical, capacitive, rubber dome, and scissor switches. Mechanical switches are often preferred by gamers and professionals for their tactile feedback and durability. Switches often include a keycap lifting mechanism.

The switch plate of a keyboard is the flat surface that supports the switches and keycaps. It is typically made of plastic or metal and provides a solid foundation for the keys to rest on or in. The underside of the switch plate also typically acts as a connection point for circuitry that connects the switches to the computer, allowing for the detection and transmission of keystrokes. Some keyboards have a removable switch plate, which can make it easier to clean or replace individual components.

A key stabilizing mechanism on a keyboard is a component that helps to keep a keycap stable and centered over its corresponding switch. This is important, because without a stabilizer certain keys, such as the larger keys like the spacebar or shift keys, may wobble or feel uneven when pressed, making typing less comfortable and accurate.

Binding refers to the undesirable situation where the mating surfaces or geometries of the stabilizer assembly become stuck or bound up against each other, restricting movement and preventing the free up-and-down movement of the overall stabilized switch assembly.

Rattle refers to the sound of the wire striking against the slider.

Ticking is the term given to the sound of the side of the hard plastic slider striking against the walls of the hard plastic housing.

The presently disclosed keyboard or stabilizer mechanism mitigates or eliminates binding, rattle, or ticking which may be exhibited with current keyboards. For example, current keyboards may exhibit loud or obnoxious noise, bind, or may require maintenance to control these and other undesired properties.

In at least one embodiment of the present disclosure, the presently disclosed stabilizer mechanism provides a keyboard with more quiet and subtle operation with minimal maintenance than currently provided keyboards. The currently disclosed stabilizer mechanism may substantially remove rattle and minimize ticking, without introducing binding.

Current keyboards may have very loose fits between components in their stabilizers since bearing sliders need to move very freely up and down within their two housings. Providing these large clearances makes this free movement possible, but at the cost of added rattle due to the hard parts hitting against each other as the mechanism operates. The reason for the need for these large clearances, however, is that current designs are kinematically over-constrained. Frequently with these over-constrained systems, friction from multiple contact surfaces may introduce unnecessary resistance into the overall mechanism, which in turn may lead to binding of the bearing and failure of the movement, which is why the large clearances are typically present.

There may be considerable variability in the distance between the two stabilized (distal) stems on keycaps across various manufacturers. Wide gaps between a stabilizer slider and its housings may allow for the slightly different lengths between stabilizer stems on varying keycaps, thus allowing a stabilizer mechanism to be used with keycaps of slightly different stem spacing without binding. However, this typically comes at the cost of increased propensity of the mechanism to generate unwanted sounds. On the other hand, decreasing those gaps can come at the cost of an increased propensity to bind, especially in over-constrained designs.

One common type of key stabilizer is called a wire stabilizer. This mechanism consists of one or more metal wires that attach to and run across the bottom of a keycap, connecting it to the switch plate of the keyboard. The interface between the parts acts as a guide, keeping the keycap centered and reducing wobbling or side-to-side movement.

Another type of key stabilizer is known a Cherry-style stabilizer. This mechanism uses a pair of plastic housings that attach to the switch plate of the keyboard, a pair of sliders that move up and down inside these housings, and a metal wire that runs through the two sliders and housings. When the key is pressed, the wire rotates in the clip, keeping the keycap stable and preventing its off-axis movement.

Both wire stabilizers and plate-mounted stabilizers can be found on mechanical keyboards and are often interchangeable, depending on the specific model and key layout. Some keyboards may also have additional stabilizers or dampeners, such as rubber O-rings, to further improve the feel and stability of the keys.

In at least one embodiment of the present disclosure, the stabilizer mechanism has at least one of a wire preload in the slider, a wire preload at wire holders, and a kinematically-optimized design that may accommodate keycap stem spacing variability.

FIG. 1 shows an illustrative example of an embodiment of the presently disclosed keyboard 100 having a stabilizer mechanism of the present disclosure. Keyboard 100 is shown with its housing removed to show its component parts. The presently disclosed stabilizer mechanism may have a wire preload in the slider. For example, keyboard 100 may have wire 124 held against slider 114 under preload by a biasing member, such as a polymeric or metal spring, to avoid rattle between wire 124 and slider 114. This wire preload may eliminate, or substantially eliminate, a primary cause of unwanted noises compared to traditional keyboard stabilizer mechanisms. The biasing member, a metal or polymeric springing member for example, may be a separate component part or may be an integral part of the slider. In at least one embodiment, the biasing member is a separate component part that may be clipped into a stabilizer slider. For example, the biasing member may have an interference with the top of stabilizer wire or arm, biasing the wire onto a lower lateral member disposed in the lower portion of the opening in the stabilizer slider, or toward a switch plate, and thus preventing clearance at any point in the assembly's travel. During assembly the biasing member, if manufactured as a separate component may be pressed into the sliders from one side and held in place under preload. In at least one embodiment, the biasing member is integral with the slider. For example, the biasing member may be a molded feature of a polymeric slider.

FIG. 1 shows keyboard 100 having a plurality of keys, each key having a keycap 102, supported on a switch plate 106. At least one of the keys has a stabilizer mechanism configured and disposed to stabilize its keycap 102. Each of the keys has a lifting mechanism 108 configured and disposed to bias its keycap 102 from switch plate 106. Lifting mechanism 108 may be a component part of, or function of, a switch as depicted in FIG. 1. At least one of the keys has a stabilizer mechanism configured and disposed to stabilize its keycap 102. For example, spacebar 103 and/or other elongated keys such as shift, backspace, return, and other keys, may have the stabilizer mechanism of the present disclosure. FIG. 1 is voided of a switch between slider 118 and housing 112 to show a stabilizer mechanism having slider 118, housing 112, and wire 124. Wire 124 may be disposed above or below switch plate 106.

Figure 2:
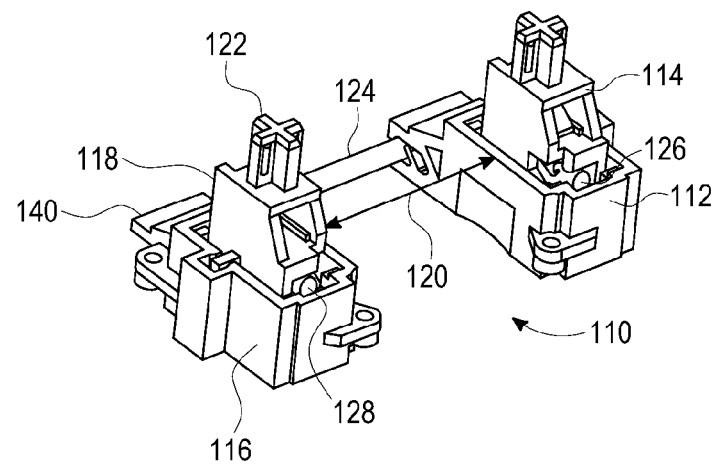
FIG. 2 shows an illustrative example of a keyboard stabilizer mechanism having a wire in cooperation with sliders.
Figure 3:
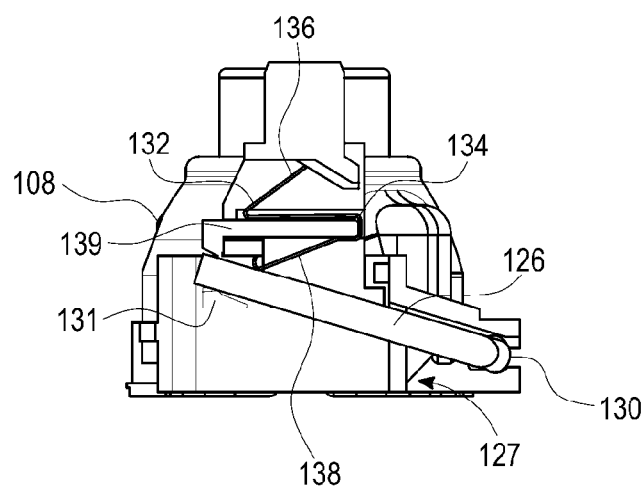
FIG. 3 shows the illustrative example shown in FIG. 2 showing the wire in cooperation with a slider.
Figure 9:
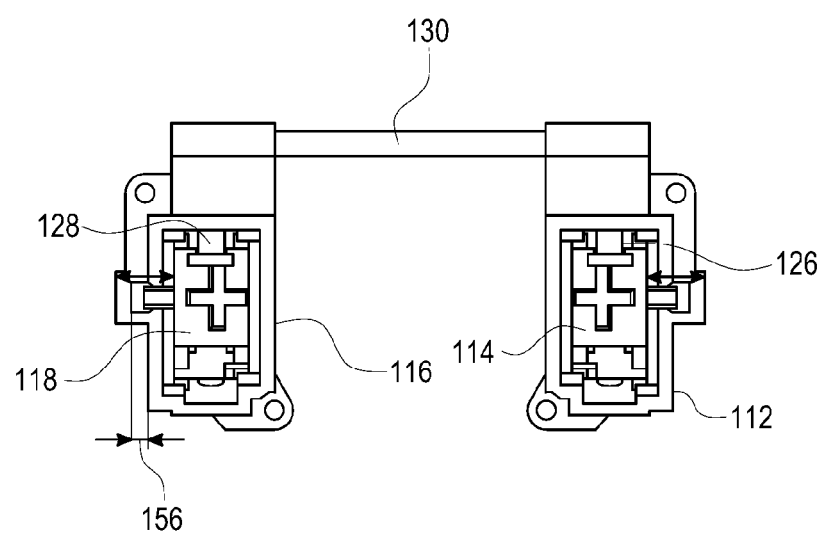
FIG. 9 shows an illustrative example of a stabilizer mechanism of the present disclosure configured to dispose keycap attachments at different spaces therebetween.

FIG. 2 shows an illustrative example of a keyboard stabilizer mechanism 110 having wire 124 in cooperation with first slider 114 and second slider 118. Stabilizer mechanism 110 has first housing 112 slidingly receiving first slider 114 and second housing 116 slidingly receiving second slider 118. Switch plate 106 holds first housing 112 and second housing 116, wherein first housing 112 is spaced from second housing 116 as indicated with arrow 120. A keycap 102 is attached to first slider 114 and second slider 118 and traverses the space between the sliders, 120. Wire 124 has a first arm 126 extending through an opening 127 in first housing 112 and into the first slider 114, a second arm 128 extending through an opening 127 in second housing 116 and into second slider 118, and a rotatable length 130 extending between first arm 126 and second arm 128, as shown in FIGS. 3 and 9. A first biasing member 132 is held in first slider 114 and is configured and disposed to bias first arm 126 to lower lateral member 131 disposed in a lower portion of first slider 114. A second biasing member 132 is held in second slider 118 and is configured and disposed to bias second arm 128 to the lower lateral member 131 disposed in second slider 118.

Figure 4:
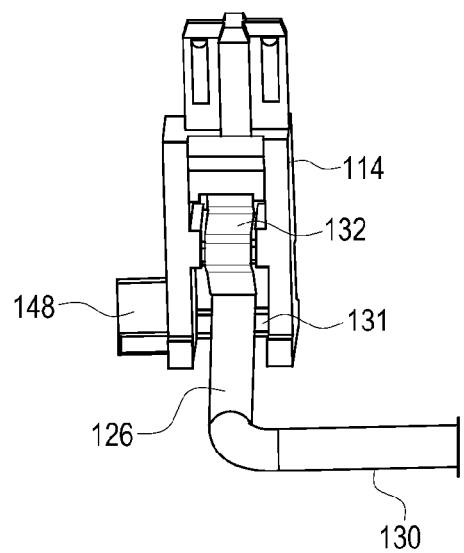
FIG. 4 shows the illustrative example shown in FIG. 2 showing the wire in cooperation with a biasing member.

FIGS. 3, 4, and 9 show an example of a wire preload in a slider. As shown, first arm 126 of wire 124 is in cooperation with first slider 114 and first housing 112. Wire 124 is in cooperation with first biasing member 132. First biasing member 132 is configured and disposed to bias first arm 126 away from keycap attachment 122, or a keycap 102 disposed therewith, and to a lower lateral member 131 disposed in a lower portion of first slider 114, throughout a keystroke moving first slider 114 toward and away from switch plate 106. A second biasing member 132 may be similarly configured and disposed with second housing 116, second slider 118, and second arm 128. For example, a second biasing member 132 may be configured and disposed to bias second arm 128 away from keycap attachment 122 and to a lower lateral member 131 in the second slider 118, throughout the keystroke. Biasing the arms of the wire from the keycap or keycap attachments and to the lower lateral members 131 substantially eliminates rattle and may aid in a smooth operation of the keyboard. In at least one embodiment of the present disclosure, a keyboard has a switch configured and disposed to lift a keycap which in turn lifts sliders and wire arms cooperating with the sliders. Springs, or biasing members, bias the wire arms from the keycap onto a lower lateral member in the sliders.

In at least one embodiment, first biasing member 132 has a central portion 134 configured and disposed to receive a central lateral member 139 in first slider 114 and hold first biasing member 132 in first slider 114. First biasing member 132 may have an upper portion 136, extending upwardly from central portion 134, configured and disposed to bias first biasing member 132 onto central lateral member 139. First biasing member 132 may have a lower portion 138, extending downwardly from central portion 134, configured and disposed to bias first arm 126 from central lateral member 139 and onto lower lateral member 131. A second biasing member 132 may be similarly configured and disposed with second housing 116, second slider 118, and second arm 128.

Figure 5:
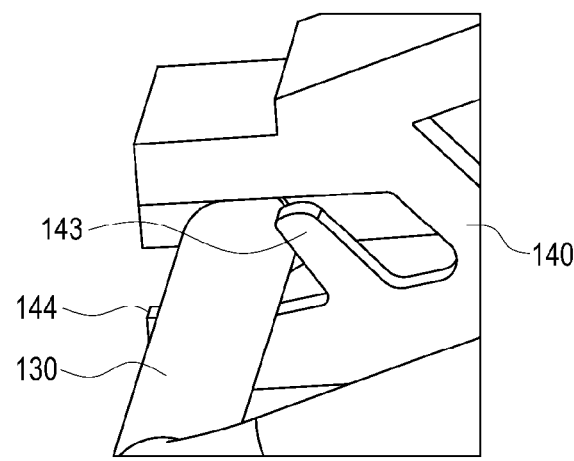
FIG. 5 shows an illustrative example of a stabilizer mechanism of the present disclosure having wire holders extending from housings.
Figure 6:
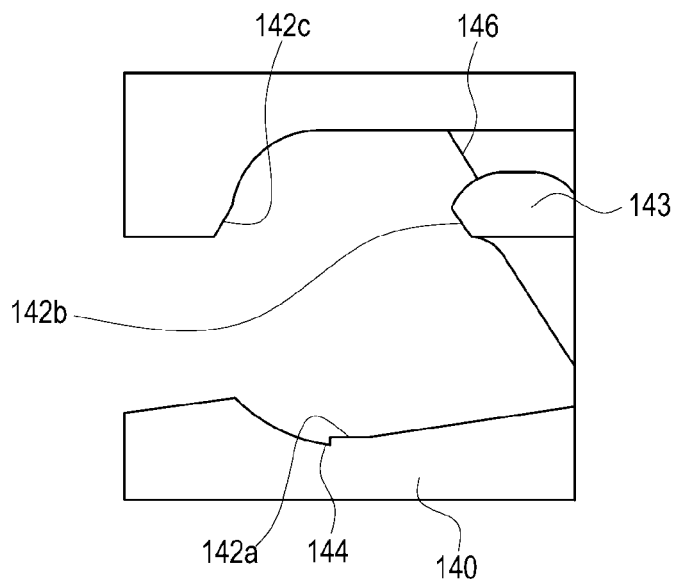
FIG. 6 shows an illustrative example of a stabilizer mechanism of the present disclosure having a wire holder with distinct contact surfaces.

FIGS. 5 and 6 show an embodiment of a stabilizer mechanism having a wire preload in wire holders extending from the housings, such as clips. FIG. 5 shows wire holder 140 extending from housing 112 and/or 116 and FIG. 6 shows an embodiment of wire holder 140 having distinct contact surfaces. Wire holders 140 may be configured to hold a rotatable length 130 of wire 124 which may prevent, or substantially eliminate, rattling of the wire proximate its pivot point. For example, wire holder 140 may have a flexible beam or deflectable jaw, 144 that has some interference with the wire, which applies a small preload therewith. In at least one embodiment, deflectable jaw 144 is comprised of a flexible material and disposes a contact surface for biasing rotatable length 130 of wire 124 against other contact surfaces.

For example, a contact surface may be supported, or disposed, with deflectable jaw 144. In at least one embodiment, deflectable jaw 144 comprises a polymeric beam and is configured to provide a desired flexibility. Deflectable jaw 144 and the housing may be an integral polymeric structure which may be molded as a single component. Wire holder 140 may function essentially as a preloaded rotary bearing for the wire rotatable length 130, preventing clearance and thus wire rattling within the wire holders.

In at least one embodiment, wire holder 140 has distinct contact surfaces. For example, wire holder 140 may have three distinct contact surfaces disposed to contact rotatable length 130 of wire 124 at about 120 degrees apart. During installation, deflectable jaw 144 may be configured to deflect to allow the wire to pass through the opening and be held proximate the front opening of wire holder 140.

In at least one embodiment, a first wire holder 140 extends from first housing 112 and is configured and disposed to rotatingly hold rotatable length 130 of wire 124 proximate first arm 126. A second wire holder 140 may extend from second housing 116 configured and disposed to rotatingly hold rotatable length 130 of wire 124 proximate second arm 128. Rotatable length 130 may be cylindrical proximate each of the arms and each of the wire holders and may have three contact surfaces, 142a, 142b, and 142c, spaced about rotatable length 130. Each of the contact surfaces may be configured and disposed to maintain contact with the rotatable length throughout a depression of the keycap, thus providing a wire preload.

Wire holder 140 may three contact surfaces, 142a, 142b, and 142c, configured to be disposed about 120 degrees apart about rotatable length 130 and one of the contact surfaces, 142b, may be disposed with a flexible arm 143. Flexible arm 143 may extend from the housing proximate the slider and be configured and disposed to bias rotatable length 130 away from the slider and against the other two contact surfaces, 142a and 142c. For example, flexible arm 143 may dispose contact surface 142b against rotatable length 130 proximate the wire arm extending into the slider. In at least one embodiment, the housing has a stop 146 configured and disposed to stop rotatable length 130 from horizontal movement into the housing. For example, stop 146 may be disposed with the housing behind flexible arm 143 to protect from wire installation overload, which may overly stress, deform, or break flexible arm 143.

In at least one embodiment, both of the housings have a wire holder 140 extending therefrom. The wire holders 140 may have three contact surfaces with at least one contact surface, 142b, disposed with a flexible material configured to bias the rotatable length of the wire against the other two contact surfaces, flexible arm 143 for example. Three contact surfaces, 142a, 142b, and 142c may be disposed about 120 degrees apart about rotatable length 130 and one of the contact surfaces, 143b, may be disposed with a flexible arm 143 extending from the housing proximate the slider. Flexible arm 143 is configured and disposed to bias rotatable length 130 outward from the slider and against the other two contact surfaces, 142a and 142c. Each of the housings may have a stop 146 configured and disposed to stop the rotatable length from horizontal movement into the housing.

Figure 7:
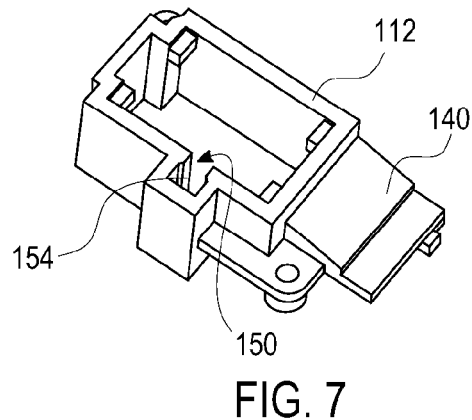
FIGS. 7 and 8 show an illustrative example of a stabilizer mechanism of the present disclosure having a slider with an extension disposed to be received with a slot in a housing.
Figure 8:
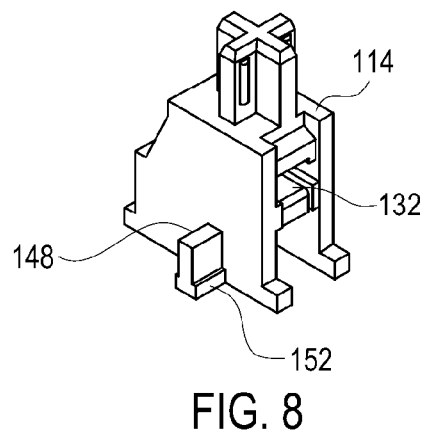

FIGS. 7 and 8 show an illustrative example of a stabilizer mechanism of the present disclosure having a slider with an extension disposed to be received in a slot in a housing, providing a tongue-in-groove interface. The extensions and slots may be configured to substantially eliminate over constraints or provide a kinematically-optimized design in the stabilizer mechanism. Under normal operation, substantially the sole interface between slider and housing is the small tongue-in-groove interface. Since the interface takes place over a relatively small area or dimension, it may ease control tolerances and thus to provide a better feel to the bearing and a reduction in ticking sounds. This configuration may also reduce the over-constraints such as the eight bearing rail surfaces exhibited with present stabilizers, which may make this disclosed stabilizer mechanism less susceptible to binding.

In at least one embodiment of the present disclosure, a first extension 148 extends from the first slider 114 and a first vertical slot 150 is disposed in first housing 112, wherein first slot 150 is configured and disposed to slidingly receive first extension 148. A second extension 148 extends from the second slider 118 and a second vertical slot 150 is disposed in second housing 116, wherein second slot 150 is configured and disposed to slidingly receive second extension 148. The extensions 148 and the slots 150 are configured and disposed to substantially eliminate rotational movement of keycap 102 and its lateral movement away from, and toward, rotatable length 130, upon depression of keycap 102. Each extension 148 may have two oppositely facing planar contact surfaces 152 configured and disposed to contact oppositely facing planar contact surfaces 154 in the slots 150, throughout a depression of the keycap.

FIG. 9 shows an illustrative example of a stabilizer mechanism of the present disclosure configured to dispose keycap attachments at different spaces therebetween. For example, a tongue-in-groove interface may be configured to allow for keycap stem location variability through the translation of sliders along the axis parallel to the length of the keycap. With a wide clearance between a slider and its housing in the direction of this translation, accommodations in variations in stem spacing on keycaps may be accommodated without introducing binding.

In at least one embodiment, keyboard 100 has a first extension 148 extending from the first slider 114 and a first vertical slot 150 disposed in first housing 112, wherein first slot 150 is configured and disposed to slidingly receive first extension 148. A second extension 148 extends from the second slider 118 and a second vertical slot 150 is disposed in second housing 116, wherein second slot 150 is configured and disposed to slidingly receive second extension 148. The extensions 148 and the slots 150 are configured and disposed to substantially eliminate rotational movement of keycap 102 and its movement away from, and toward, rotatable length 130, upon depression of keycap 102. Each extension 148 may have two oppositely facing planar contact surfaces 152 configured and disposed to contact oppositely facing planar contact surfaces 154 in the slots 150, throughout a depression of the keycap. The extensions 148 and the slots 150 may be configured and disposed for slidingly holding the sliders at different spaces therebetween, spacing 156, enabling the stabilizer mechanism to hold keycaps having differently spaced slider mounting points. The keycap mounting points are configured to cooperate with keycap attachments 122 for mounting the keycap on the sliders.

It is to be understood that aspects of the currently disclosed stabilizer mechanism may have like components or components that may be mirror images of components. A reference to a first component may also reference or describe a second component. For example, a description of a first slider may also serve to describe a second slider as they may be mirror images of one another.

One feature or aspect of an embodiment is believed at the time of the filing of this patent application to possibly reside broadly in a keyboard comprising: a plurality of keys, each having a keycap, supported on a switch plate; each of the keys having a lifting mechanism configured and disposed to bias its keycap from the switch plate; at least one of the keys having a stabilizer mechanism configured and disposed to stabilize its keycap, the stabilizer mechanism comprising: a first housing slidingly receiving a first slider; a second housing slidingly receiving a second slider; the switch plate holding the first housing and the second housing, wherein the first housing is spaced from the second housing; the keycap is attached to the first slider and the second slider and traverses the space between the sliders; a wire having a first arm extending through an opening in the first housing and into the first slider, a second arm extending through an opening in the second housing and into the second slider, and a rotatable length extending between the first arm and the second arm; a first biasing member in the first slider configured and disposed to bias the first arm from the keycap and to a lower lateral member in the first slider; and a second biasing member in the second slider configured and disposed to bias the second arm from the keycap and to a lower lateral member in the second slider.

Another feature or aspect of an embodiment is believed at the time of the filing of this patent application to possibly reside broadly in the keyboard, wherein each of the biasing members has a central portion configured and disposed to receive a central lateral member in the slider and hold the biasing member in the slider.

Yet another feature or aspect of an embodiment is believed at the time of the filing of this patent application to possibly reside broadly in the keyboard, wherein each of the biasing members has an upper portion, extending upwardly from their central portions, configured and disposed to bias the biasing members onto the central lateral members.

Still another feature or aspect of an embodiment is believed at the time of the filing of this patent application to possibly reside in the keyboard, wherein each of the biasing members has a lower portion, extending downwardly from their central portions, configured and disposed to bias the arms onto the lower lateral members in the sliders.

A further feature or aspect of an embodiment is believed at the time of the filing of this patent application to possibly reside broadly in the keyboard, further comprising: a first wire holder extending from the first housing configured and disposed to rotatingly hold the rotatable length of wire proximate its first arm; a second wire holder extending from the second housing configured and disposed to rotatingly hold the rotatable length of wire proximate its second arm; and wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

Another feature or aspect of an embodiment is believed at the time of the filing of this patent application to possibly reside broadly in the keyboard, wherein at least one of the contact surfaces is disposed with a flexible material configured to bias the rotatable length of the wire against the other two contact surfaces.

Yet another feature or aspect of an embodiment is believed at the time of the filing of this patent application to possibly reside broadly in the keyboard, wherein the three contact surfaces are disposed about 120 degrees apart about the rotatable length and one of the contact surfaces is disposed with a flexible arm extending from the housing proximate the slider, the flexible arm is configured and disposed to bias the rotatable length away from the slider and against the other two contact surfaces.

Still another feature or aspect of an embodiment is believed at the time of the filing of this patent application to possibly reside broadly in the keyboard, wherein each of the housings have a stop configured and disposed to stop the rotatable length from horizontal movement into the housing.

A further feature or aspect of an embodiment is believed at the time of the filing of this patent application to possibly reside broadly in the keyboard, further comprising: a first extension extending from the first slider and a first vertical slot in the first housing, wherein the first slot is configured and disposed to slidingly receive the first extension; a second extension extending from the second slider and a second vertical slot in the second housing, wherein the second slot is configured and disposed to slidingly receive the second extension; and wherein the extensions and the first and the second slots are configured and disposed to substantially eliminate rotational movement of the keycap and its lateral movement away from, and toward, the rotatable length, upon depression of the keycap.

Another feature or aspect of an embodiment is believed at the time of the filing of this patent application to possibly reside broadly in the keyboard, wherein the first extension has two oppositely facing planar contact surfaces configured and disposed to contact oppositely facing planar contact surfaces in the first slot and the second extension has two oppositely facing planar contact surfaces configured and disposed to contact oppositely facing planar contact surfaces in the second slot, throughout a depression of the keycap.

Yet another feature or aspect of an embodiment is believed at the time of the filing of this patent application to possibly reside broadly in the keyboard, wherein the extensions and the slots are configured and disposed for slidingly holding the sliders at different spaces therebetween, enabling the stabilizer mechanism to hold keycaps having differently spaced slider mounting points.

One feature or aspect of an embodiment is believed at the time of the filing of this patent application to possibly reside broadly in a keyboard comprising: a plurality of keys, each having a keycap, supported on a switch plate; each of the keys having a lifting mechanism configured and disposed to bias its keycap from the switch plate; at least one of the keys having a stabilizer mechanism configured and disposed to stabilize its keycap, the stabilizer mechanism comprising: a first housing slidingly receiving a first slider; a second housing slidingly receiving a second slider; the switch plate holding the first housing and the second housing, wherein the first housing is spaced from the second housing; the keycap is attached to the first slider and the second slider and traverses the space between the sliders; a wire having a first arm extending through an opening in the first housing and into the first slider, a second arm extending through an opening in the second housing and into the second slider, and a rotatable length extending between the first arm and the second arm; a first wire holder extending from the first housing configured and disposed to rotatingly hold the rotatable length of wire proximate its first arm; a second wire holder extending from the second housing configured and disposed to rotatingly hold the rotatable length of wire proximate its second arm; and wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

Another feature or aspect of an embodiment is believed at the time of the filing of this patent application to possibly reside broadly in the keyboard, wherein at least one of the contact surfaces is disposed with a flexible material configured to bias the rotatable length of the wire against the other two contact surfaces.

Yet another feature or aspect of an embodiment is believed at the time of the filing of this patent application to possibly reside broadly in the keyboard, wherein the three contact surfaces are disposed about 120 degrees apart about the rotatable length and one of the contact surfaces is disposed with a flexible arm extending from the housing proximate the slider, the flexible arm is configured and disposed to bias the rotatable length away from the slider and against the other two contact surfaces.

Still another feature or aspect of an embodiment is believed at the time of the filing of this patent application to possibly reside broadly in the keyboard, wherein each of the housings have a stop configured and disposed to stop the rotatable length from horizontal movement into the housing.

A further feature or aspect of an embodiment is believed at the time of the filing of this patent application to possibly reside broadly in the keyboard, further comprising: a first biasing member in the first slider configured and disposed to bias the first arm from the keycap and to a lower lateral member in the first slider; and a second biasing member in the second slider configured and disposed to bias the second arm from the keycap and to a lower lateral member in the second slider.

Another feature or aspect of an embodiment is believed at the time of the filing of this patent application to possibly reside broadly in the keyboard, wherein each of the biasing members has a central portion configured and disposed to receive a central lateral member in the slider and hold the biasing member in the slider.

Yet another feature or aspect of an embodiment is believed at the time of the filing of this patent application to possibly reside broadly in the keyboard, wherein each of the biasing members has an upper portion, extending upwardly from their central portions, configured and disposed to bias the biasing members onto the central lateral members.

Still another feature or aspect of an embodiment is believed at the time of the filing of this patent application to possibly reside broadly in the keyboard, wherein each of the biasing members has a lower portion, extending downwardly from their central portions, configured and disposed to bias the arms onto the lower lateral members in the sliders. A further feature or aspect of an embodiment is believed at the time of the filing of this patent application to possibly reside broadly in the keyboard, further comprising: a first extension extending from the first slider and a first vertical slot in the first housing, wherein the first slot is configured and disposed to slidingly receive the first extension; a second extension extending from the second slider and a second vertical slot in the second housing, wherein the second slot is configured and disposed to slidingly receive the second extension; wherein the extensions and the first and the second slots are configured and disposed to substantially eliminate rotational movement of the keycap and its lateral movement away from, and toward, the rotatable length, upon depression of the keycap.

Another feature or aspect of an embodiment is believed at the time of the filing of this patent application to possibly reside broadly in the keyboard, wherein the first extension has two oppositely facing planar contact surfaces configured and disposed to contact oppositely facing planar contact surfaces in the first slot and the second extension has two oppositely facing planar contact surfaces configured and disposed to contact oppositely facing planar contact surfaces in the second slot, throughout a depression of the keycap.

Yet another feature or aspect of an embodiment is believed at the time of the filing of this patent application to possibly reside broadly in the keyboard, wherein the extensions and the slots are configured and disposed for slidingly holding the sliders at different spaces therebetween, enabling the stabilizer mechanism to hold keycaps having differently spaced slider mounting points.

One feature or aspect of an embodiment is believed at the time of the filing of this patent application to possibly reside broadly in a keyboard comprising: a plurality of keys, each having a keycap, supported on a switch plate; each of the keys having a keycap and lifting mechanism configured and disposed to bias the keycaps from the switch plate; at least one of the keys having a stabilizer mechanism configured and disposed to stabilize its keycap, the stabilizer mechanism comprising: a first housing slidingly receiving a first slider; a second housing slidingly receiving a second slider; the switch plate holding the first housing and the second housing, wherein the first housing is spaced from the second housing; the keycap is attached to the first slider and the second slider and traverses the space between the sliders; a wire having a first arm extending through an opening in the first housing and into the first slider, a second arm extending through an opening in the second housing and into the second slider, and a rotatable length extending between the first arm and the second arm; the first slider having a first extension and the first housing having a first vertical slot configured to slidingly receive the first extension; the second slider having a second extension and the second housing having a second vertical slot configured to slidingly receive the second extension; and wherein the extensions and the first and the second slots are configured and disposed to substantially eliminate rotational movement of the keycap and its lateral movement away from, and toward, the rotatable length, upon depression of the keycap.

Another feature or aspect of an embodiment is believed at the time of the filing of this patent application to possibly reside broadly in the keyboard, wherein the first extension has two oppositely facing planar contact surfaces configured and disposed to contact oppositely facing planar contact surfaces in the first slot and the second extension has two oppositely facing planar contact surfaces configured and disposed to contact oppositely facing planar contact surfaces in the second slot, throughout a depression of the keycap.

Yet another feature or aspect of an embodiment is believed at the time of the filing of this patent application to possibly reside broadly in the keyboard, wherein the extensions and the slots are configured and disposed for slidingly holding the sliders at different spaces therebetween, enabling the stabilizer mechanism to hold keycaps having differently spaced slider mounting points.

Still another feature or aspect of an embodiment is believed at the time of the filing of this patent application to possibly reside broadly in the keyboard, further comprising: a first biasing member in the first slider configured and disposed to bias the first arm from the keycap and to a lower lateral member in the first slider; and a second biasing member in the second slider configured and disposed to bias the second arm from the keycap and to a lower lateral member in the second slider.

A further feature or aspect of an embodiment is believed at the time of the filing of this patent application to possibly reside broadly in the keyboard, wherein each of the biasing members has a central portion configured and disposed to receive a central lateral member in the slider and hold the biasing member in the slider.

Another feature or aspect of an embodiment is believed at the time of the filing of this patent application to possibly reside broadly in the keyboard, wherein each of the biasing members has an upper portion, extending upwardly from their central portions, configured and disposed to bias the biasing members onto the central lateral members.

Yet another feature or aspect of an embodiment is believed at the time of the filing of this patent application to possibly reside broadly in the keyboard, wherein each of the biasing members has a lower portion, extending downwardly from their central portions, configured and disposed to bias the arms onto the lower lateral members in the sliders.

Still another feature or aspect of an embodiment is believed at the time of the filing of this patent application to possibly reside broadly in the keyboard, further comprising: a first wire holder extending from the first housing configured and disposed to rotatingly hold the rotatable length of wire proximate its first arm; a second wire holder extending from the second housing configured and disposed to rotatingly hold the rotatable length of wire proximate its second arm; and wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

A further feature or aspect of an embodiment is believed at the time of the filing of this patent application to possibly reside broadly in the keyboard, wherein at least one of the contact surfaces is disposed with a flexible material configured to bias the rotatable length of the wire against the other two contact surfaces.

Another feature or aspect of an embodiment is believed at the time of the filing of this patent application to possibly reside broadly in the keyboard, wherein the three contact surfaces are disposed about 120 degrees apart about the rotatable length and one of the contact surfaces is disposed with a flexible arm extending from the housing proximate the slider, the flexible arm is configured and disposed to bias the rotatable length away from the slider and against the other two contact surfaces.

Yet another feature or aspect of an embodiment is believed at the time of the filing of this patent application to possibly reside broadly in the keyboard, wherein each of the housings have a stop configured and disposed to stop the rotatable length from horizontal movement into the housing.

One feature or aspect of an embodiment is believed at the time of the filing of this patent application to possibly reside broadly in a stabilizer mechanism for a keyboard comprising: a first housing slidingly receiving a first slider; a second housing slidingly receiving a second slider; the first housing and the second housing being held with a space therebetween; a keycap attachment extends from each of the sliders; a wire having a first arm extending through an opening in the first housing and into the first slider, a second arm extending through an opening in the second housing and into the second slider, and a rotatable length extending between the first arm and the second arm; a first biasing member in the first slider configured and disposed to bias the first arm from its keycap attachment and to a lower lateral member in the first slider; and a second biasing member in the second slider configured and disposed to bias the second arm from its keycap attachment and to a lower lateral member in the second slider.

Another feature or aspect of an embodiment is believed at the time of the filing of this patent application to possibly reside broadly in a stabilizer mechanism for a keyboard comprising: a first housing slidingly receiving a first slider; a second housing slidingly receiving a second slider; the first housing and the second housing being held with a space therebetween; a keycap attachment extends from each of the sliders; a wire having a first arm extending through an opening in the first housing and into the first slider, a second arm extending through an opening in the second housing and into the second slider, and a rotatable length extending between the first arm and the second arm; a first wire holder extending from the first housing configured and disposed to rotatingly hold the rotatable length of wire proximate its first arm; a second wire holder extending from the second housing configured and disposed to rotatingly hold the rotatable length of wire proximate its second arm; and wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

Yet another feature or aspect of an embodiment is believed at the time of the filing of this patent application to possibly reside broadly in a stabilizer mechanism for a keyboard comprising: a first housing slidingly receiving a first slider; a second housing slidingly receiving a second slider; the first housing and the second housing being held with a space therebetween; a keycap attachment extends from each of the sliders; a wire having a first arm extending through an opening in the first housing and into the first slider, a second arm extending through an opening in the second housing and into the second slider, and a rotatable length extending between the first arm and the second arm; the first slider having a first extension and the first housing having a first vertical slot configured to slidingly receive the first extension; the second slider having a second extension and the second housing having a second vertical slot configured to slidingly receive the second extension; and wherein the extensions and the first and the second slots are configured and disposed to substantially eliminate rotational movement of the keycap and its lateral movement away from, and toward, the rotatable length, upon depression of the keycap.

NOMENCLATURE 100 keyboard
102 keycap
103 space bar
106 switch plate
108 switch/lifting mechanism
110 stabilizer mechanism 112 first housing
114 first slider
116 second housing
118 second slider
120 space between first housing and second housing
122 keycap attachment
124 wire
126 first arm of wire
127 opening
128 second arm of wire
130 rotatable length of wire
131 lower lateral member
132 biasing member
134 biasing member central portion
136 biasing member upper portion
138 biasing member lower portion
139 central lateral member
140 wire holder
142a, 142b, 142c contact surfaces
143 flexible arm
144 deflectable jaw
146 stop
148 extension
150 vertical slot
152 extension planar contact surfaces
154 slot planar contact surfaces
156 variable spacing between sliders It will be understood that the examples of patents, published patent applications, and other documents which are included below in this application and which are referred to in paragraphs which state "Some examples of . . . which may possibly be used in at least one possible embodiment of the present application . . . " may possibly not be used or useable in any one or more embodiments of the application. These references, or portions thereof, are hereby incorporated by reference herein. The purpose of incorporating U.S. patents, foreign patents, publications, etc. is solely to provide additional information relating to technical features of one or more embodiments, which information may not be completely disclosed in the wording in the pages of this application. Words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more embodiments, are not considered to be incorporated by reference herein.

Some examples of features which may possibly be utilizable by at least one possible embodiment may possibly be found in the following which are incorporated by reference herein:

US20030209417 titled "KEY SWITCH STABILIZER MECHANISM", by Yoneyama, Masayuki, filed 2003 Mar. 13; US20180197699 titled "KEY STABILIZER", by Shen, Hai-nan, filed 2017 Jul. 18; U.S. Pat. No. 3,720,801 titled "SPACE KEY", by Yanaga M, filed 1972 Feb. 3; U.S. Pat. No. 4,384,796 titled "KEYBOARD SPACE BAR STABILIZER", by Denley, Ronald S., filed 1982-03-18; U.S. Pat. No. 4,468,145 titled "KEYBOARD SPACE BAR STABILIZER", by Denley, Ronald S., filed 1983 May 11; and U.S. Pat. No. 4,584,444 titled "KEYBOARD SWITCH", by Nagashima, Takao, filed 1984 Sep. 21.

The invention claimed is:

1. A keyboard comprising:
 a plurality of keys, each having a keycap, supported on a switch plate;
 each of the keys having a lifting mechanism configured and disposed to bias its keycap from the switch plate; and
 at least one of the keys having a stabilizer mechanism configured and disposed to stabilize its keycap, the stabilizer mechanism comprising:
  a first housing slidingly receiving a first slider;
  a second housing slidingly receiving a second slider;
  the switch plate holding the first housing and the second housing, wherein the first housing is spaced from the second housing;
  the keycap is attached to the first slider and the second slider and traverses the space between the sliders;
  a wire having a first arm extending through an opening in the first housing and into the first slider, a second arm extending through an opening in the second housing and into the second slider, and a rotatable length extending between the first arm and the second arm;
  a first biasing member in the first slider configured and disposed to bias the first arm from the keycap and to a lower lateral member in the first slider; and
  a second biasing member in the second slider configured and disposed to bias the second arm from the keycap and to a lower lateral member in the second slider.

2. The keyboard of claim 1, wherein each of the biasing members has a central portion configured and disposed to receive a central lateral member in the slider and hold the biasing member in the slider.

3. The keyboard of claim 2, wherein each of the biasing members has an upper portion, extending upwardly from their central portions, configured and disposed to bias the biasing members onto the central lateral members.

4. The keyboard of claim 2, wherein each of the biasing members has a lower portion, extending downwardly from their central portions, configured and disposed to bias the arms onto the lower lateral members in the sliders.

5. The keyboard of claim 1, further comprising:
 a first wire holder extending from the first housing configured and disposed to rotatingly hold the rotatable length of wire proximate its first arm;
 a second wire holder extending from the second housing configured and disposed to rotatingly hold the rotatable length of wire proximate its second arm; and
 wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

6. The keyboard of claim 5, wherein at least one of the contact surfaces is disposed with a flexible material configured to bias the rotatable length of the wire against the other two contact surfaces.

7. The keyboard of claim 6, wherein the three contact surfaces are disposed about 120 degrees apart about the rotatable length and one of the contact surfaces is disposed with a flexible arm extending from the housing proximate the slider, the flexible arm is configured and disposed to bias the rotatable length away from the slider and against the other two contact surfaces.

8. The keyboard of claim 1, further comprising:
a first extension extending from the first slider and a first vertical slot in the first housing, wherein the first slot is configured and disposed to slidingly receive the first extension;
a second extension extending from the second slider and a second vertical slot in the second housing, wherein the second slot is configured and disposed to slidingly receive the second extension; and
wherein the extensions and the first and the second slots are configured and disposed to substantially eliminate rotational movement of the keycap and its lateral movement away from, and toward, the rotatable length, upon depression of the keycap.

9. The keyboard of claim 8, wherein the extensions and the slots are configured and disposed for slidingly holding the sliders at different spaces therebetween, enabling the stabilizer mechanism to hold keycaps having differently spaced slider mounting points.

10. A keyboard comprising:
a plurality of keys, each having a keycap, supported on a switch plate;
each of the keys having a lifting mechanism configured and disposed to bias its keycap from the switch plate;
at least one of the keys having a stabilizer mechanism configured and disposed to stabilize its keycap, the stabilizer mechanism comprising:
a first housing slidingly receiving a first slider;
a second housing slidingly receiving a second slider;
the switch plate holding the first housing and the second housing, wherein the first housing is spaced from the second housing;
the keycap is attached to the first slider and the second slider and traverses the space between the sliders;
a wire having a first arm extending through an opening in the first housing and into the first slider, a second arm extending through an opening in the second housing and into the second slider, and a rotatable length extending between the first arm and the second arm;
a first wire holder extending from the first housing configured and disposed to rotatingly hold the rotatable length of wire proximate its first arm;
a second wire holder extending from the second housing configured and disposed to rotatingly hold the rotatable length of wire proximate its second arm; and
wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

11. The keyboard of claim 10, wherein at least one of the contact surfaces is disposed with a flexible material configured to bias the rotatable length of the wire against the other two contact surfaces.

12. The keyboard of claim 10, wherein the three contact surfaces are disposed about 120 degrees apart about the rotatable length and one of the contact surfaces is disposed with a flexible arm extending from the housing proximate the slider, the flexible arm is configured and disposed to bias the rotatable length away from the slider and against the other two contact surfaces.

13. The keyboard of claim 10, further comprising:
a first biasing member in the first slider configured and disposed to bias the first arm from the first slider; and
a second biasing member in the second slider configured and disposed to bias the second arm from the second slider.

14. The keyboard of claim 10, further comprising:
a first extension extending from the first slider and a first vertical slot in the first housing, wherein the first slot is configured and disposed to slidingly receive the first extension;
a second extension extending from the second slider and a second vertical slot in the second housing, wherein the second slot is configured and disposed to slidingly receive the second extension; and
wherein the extensions and the first and the second slots are configured and disposed to substantially eliminate rotational movement of the keycap and its lateral movement away from, and toward, the rotatable length, upon depression of the keycap.

15. The keyboard of claim 14, wherein the extensions and the slots are configured and disposed for slidingly holding the sliders at different spaces therebetween, enabling the stabilizer mechanism to hold keycaps having differently spaced slider mounting points.

16. A keyboard comprising:
a plurality of keys, each having a keycap, supported on a switch plate;
each of the keys having a keycap and lifting mechanism configured and disposed to bias the keycaps from the switch plate; and
at least one of the keys having a stabilizer mechanism configured and disposed to stabilize its keycap, the stabilizer mechanism comprising:
a first housing slidingly receiving a first slider;
a second housing slidingly receiving a second slider;
the switch plate holding the first housing and the second housing, wherein the first housing is spaced from the second housing;
the keycap is attached to the first slider and the second slider and traverses the space between the sliders;
a wire having a first arm extending through an opening in the first housing and into the first slider, a second arm extending through an opening in the second housing and into the second slider, and a rotatable length extending between the first arm and the second arm;
the first slider having a first extension and the first housing having a first vertical slot configured to slidingly receive the first extension;
the second slider having a second extension and the second housing having a second vertical slot configured to slidingly receive the second extension; and
wherein the extensions and the first and the second slots are configured and disposed to substantially eliminate rotational movement of the keycap and its lateral movement away from, and toward, the rotatable length, upon depression of the keycap.

17. The keyboard of claim 16, wherein the first extension has two oppositely facing planar contact surfaces configured and disposed to contact oppositely facing planar contact surfaces in the first slot and the second extension has two oppositely facing planar contact surfaces configured and disposed to contact oppositely facing planar contact surfaces in the second slot, throughout a depression of the keycap.

18. The keyboard of claim 17, wherein the extensions and the slots are configured and disposed for slidingly holding the sliders at different spaces therebetween, enabling the stabilizer mechanism to hold keycaps having differently spaced slider mounting points.

19. The keyboard of claim 16, further comprising:
a first biasing member in the first slider configured and disposed to bias the first arm from the first slider; and
a second biasing member in the second slider configured and disposed to bias the second arm from the second slider.

20. The keyboard of claim 16, further comprising:
a first wire holder extending from the first housing configured and disposed to rotatingly hold the rotatable length of wire proximate its first arm;
a second wire holder extending from the second housing configured and disposed to rotatingly hold the rotatable length of wire proximate its second arm; and
wherein the rotatable length is cylindrical proximate each of the arms and each of the wire holders has three contact surfaces spaced about the rotatable length, each of the contact surfaces being configured and disposed to maintain contact with the rotatable length throughout a depression of the keycap.

* * * * *